United States Patent
Yu et al.

(10) Patent No.: US 10,917,212 B2
(45) Date of Patent: Feb. 9, 2021

(54) DEFAULT QCL ASSUMPTION FOR PDSCH RECEPTION

(71) Applicant: MEDIATEK INC., Hsin-Chu (TW)

(72) Inventors: Chia-Hao Yu, Hsin-Chu (TW);
Cheng-Rung Tsai, Hsin-Chu (TW);
Weidong Yang, San Jose, CA (US)

(73) Assignee: MediaTek INC., Hsin-Chu (TW)

( * ) Notice: Subject to any disclaimer, the term of this patent is extended or adjusted under 35 U.S.C. 154(b) by 0 days.

(21) Appl. No.: 16/536,571

(22) Filed: Aug. 9, 2019

(65) Prior Publication Data

US 2020/0052844 A1 Feb. 13, 2020

Related U.S. Application Data

(60) Provisional application No. 62/717,147, filed on Aug. 10, 2018.

(51) Int. Cl.
*H04L 5/00* (2006.01)
*H04W 72/04* (2009.01)

(52) U.S. Cl.
CPC ............ *H04L 5/0048* (2013.01); *H04L 5/001* (2013.01); *H04L 5/0023* (2013.01); *H04W 72/042* (2013.01); *H04W 72/048* (2013.01)

(58) Field of Classification Search
CPC .............................. H04L 5/001; H04W 72/042
See application file for complete search history.

(56) References Cited

U.S. PATENT DOCUMENTS

| | | | |
|---|---|---|---|
| 2018/0042028 A1 | 2/2018 | Nam et al. | |
| 2018/0132243 A1 | 5/2018 | Yang et al. | |
| 2018/0219606 A1 | 8/2018 | Ng et al. | |
| 2019/0141693 A1* | 5/2019 | Guo .................. | H04L 5/0053 |

(Continued)

FOREIGN PATENT DOCUMENTS

| | | |
|---|---|---|
| CN | 107659994 A | 9/2017 |
| CN | 107949064 A | 12/2017 |

(Continued)

OTHER PUBLICATIONS

International Search Report and Written Opinion of International Search Authority for PCT/CN2019/100230 dated Oct. 30, 2019 (9 pages).

(Continued)

*Primary Examiner* — Hoon J Chung
(74) *Attorney, Agent, or Firm* — Imperium Patent Works; Zheng Jin

(57) ABSTRACT

A method of default Quasi-Co-Location (QCL) assumption for Physical Downlink Shared Channel (PDSCH) reception in NR network is proposed. When PDSCH is scheduled by a DCI over PDCCH after a Scheduling Offset, the spatial RX filter for the PDSCH reception can be determined according to a QCL indication conveyed by the DCI. When the Scheduling Offset for PDSCH reception scheduled by DCI is less than a time duration, then a default QCL assumption is applied. UE assumes that the DMRS ports of PDSCH of a serving cell are QCLed with the RS(s) with respect to QCL parameter(s) used for PDCCH QCL indication of a CORE-SET. The CORESET is associated with a UE-monitored search space in the latest slot with the lowest CORESET-IF on an active BWP on the serving cell.

22 Claims, 4 Drawing Sheets

(56) References Cited

U.S. PATENT DOCUMENTS

2019/0349964 A1* 11/2019 Liou ................ H04W 72/1284
2020/0112355 A1   4/2020 Park et al.

FOREIGN PATENT DOCUMENTS

| CN | 108199819 A | 2/2018 |
|----|----|----|
| WO | WO2018089262 A1 | 11/2016 |
| WO | WO2018106043 A1 | 12/2016 |
| WO | WO2018143721 A1 | 2/2017 |

OTHER PUBLICATIONS

R1-1806507 3GPP TSG RAN WG1 Meeting #93, Intel Copr., "Remaining Issues on Beam Management", Busan, Korea, May 21-25, 2018 (8 pages).
Taiwan IPO, office action for the TW patent application 108128519 (no English translation is available) dated Aug. 6, 2020 (3 pages).

* cited by examiner

DEFAULT QCL ASSUMPTION FOR PDSCH RECEPTION

CROSS REFERENCE TO RELATED APPLICATIONS

This application claims priority under 35 U.S.C. § 119 from U.S. Provisional Application No. 62/717,147, entitled "Mechanisms for Simultaneous Reception of Multiplexed Physical Channels/Reference Signals," filed on Aug. 10, 2018, the subject matter of which is incorporated herein by reference.

TECHNICAL FIELD

The disclosed embodiments relate generally to wireless network communications, and, more particularly, to Physical Downlink Shared Channel (PDSCH) reception in 5G new radio (NR) wireless communications systems.

BACKGROUND

Third generation partnership project (3GPP) and Long-Term Evolution (LTE) mobile telecommunication systems provide high data rate, lower latency and improved system performances. In 3GPP LTE networks, an evolved universal terrestrial radio access network (E-UTRAN) includes a plurality of base stations, e.g., evolved Node-Bs (eNBs) communicating with a plurality of mobile stations referred as user equipment (UEs). Orthogonal Frequency Division Multiple Access (OFDMA) has been selected for LTE downlink (DL) radio access scheme due to its robustness to multipath fading, higher spectral efficiency, and bandwidth scalability. Multiple access in the downlink is achieved by assigning different sub-bands (i.e., groups of subcarriers, denoted as resource blocks (RBs)) of the system bandwidth to individual users based on their existing channel condition.

The bandwidth shortage increasingly experienced by mobile carriers has motivated the exploration of the under-utilized Millimeter Wave (mmWave) frequency spectrum around 30G and 300G Hz for the next generation 5G broadband cellular communication networks. The available spectrum of mmWave band is two hundred times greater than the conventional cellular system. The mmWave wireless network uses directional communications with narrow beams and can support multi-gigabit data rate. 5G new radio (NR) beamforming wireless systems support UEs operating with single wideband carrier and UEs operating with intra-band carrier aggregation over the same contiguous spectrum simultaneously.

Furthermore, to save power, NR introduces the concept of bandwidth part (BWP), which consist of a continuous range of physical resource blocks (PRBs) in frequency domain and whose occupied bandwidth is the subset of the bandwidth of the associated carrier. That is, the bandwidth of a BWP in a carrier is the subset of the carrier bandwidth, where the carrier bandwidth is divided into multiple continuous frequency band with a smaller bandwidth. UE can be configured by the network with several uplink (UL) BWPs and downlink (DL) BWPs, and UE is required to monitor at most one uplink BWP and downlink BWP at the same time. The downlink BWP and uplink BWP which is being used or monitored by the UE is called active BWP, e.g. active DL BWP and active UL BWP respectively. As a result, power consumption to monitor the downlink can be reduced because UE is only required to monitoring the smaller frequency range of the active BWP, rather than monitor the whole carrier bandwidth.

In NR, a Physical Downlink Shared Channel (PDSCH) scheduled by a Downlink Control Information (DCI) over a Physical Downlink Control Channel (PDCCH) can be subjected to a scheduling offset. In a mmWave communication system where beamforming is applied at UE, a corresponding spatial RX filter is needed for UE to properly receive the PDSCH. In the current NR design, the spatial RX filter for a PDSCH reception can be determined according to a Quasi-Co-Location (QCL) indication conveyed by the DCI. There is a time duration for determining and applying a spatial RX filter according to the QCL indication for the PDSCH reception, where the time duration may include a latency for decoding the DCI and a latency for adjusting the spatial RX filter. If a scheduling offset for a PDSCH reception scheduled by a DCI is less than a time duration for determining and applying a spatial RX filter according to a QCL indication conveyed by the DCI, a default QCL assumption needs to be defined for the UE.

A UE can be configured with one or multiple Control Resource SETs (CORESETs) configurations. In the current NR design, the default QCL assumption for PDSCH reception is "the DMRS ports of PDSCH of a serving cell are QCLed with the RS(s) with respect to the QCL parameter(s) used for PDCCH QCL indication of the CORESET with the lowest CORESET-ID associated with a monitored search space in the latest slot in which one or more CORESETs are monitored by the UE." However, in carrier aggregation or dual-connectivity mode, multiple serving cells can be configured. In addition, a number of BWPs can be configured per serving cell. Thus, there could be more than one CORESETS with the lowest CORESET ID monitored by the UE in different serving cells. A solution is sought.

SUMMARY

A method of default Quasi-Co-Location (QCL) assumption for Physical downlink shared channel (PDSCH) reception in NR network is proposed. When PDSCH is scheduled by a DCI over PDCCH after a Scheduling Offset, the spatial RX filter for the PDSCH reception can be determined according to a QCL indication conveyed by the DCI. There is a time duration for determining and applying a spatial RX filter according to the QCL indication for the PDSCH reception. When the Scheduling Offset for PDSCH reception scheduled by DCI is less than the time duration, then a default QCL assumption needs to be defined for the corresponding PDSCH reception for the UE. UE assumes that the demodulation reference signal (DMRS) ports of PDSCH of a serving cell are QCLed with the reference signals (RS(s)) with respect to the QCL parameter(s) used for PDCCH QCL indication of the CORESET with the lowest CORESET-ID associated with a UE-monitored search space in the latest slot on an active BWP of the serving cell.

In one embodiment, a UE receives configuration information of one or more CORESETs transmitted from a base station in a wireless communications network. The configuration information of each CORESET comprises at least a CORESET-ID. The UE receives a downlink control information (DCI) over a physical downlink control channel (PDCCH) that schedules a physical downlink shared channel (PDSCH) to be received on a bandwidth part (BWP) of a serving cell by the UE after an offset. The UE determines a reference CORESET from the one or more CORESETs that are associated with the BWP of the serving cell based on a predefined rule. The UE assumes one or more demodulation reference signal (DMRS) ports of the PDSCH are QCLed with one or more references signals with respect to one or more QCL parameters used as a QCL assumption for PDCCH reception in the reference CORESET when the offset is less than a time duration for PDSCH reception. The UE performs reception for the PDSCH on the BWP of the serving cell.

Other embodiments and advantages are described in the detailed description below. This summary does not purport to define the invention. The invention is defined by the claims.

DETAILED DESCRIPTION

Reference will now be made in detail to some embodiments of the invention, examples of which are illustrated in the accompanying drawings.

Figure 1:
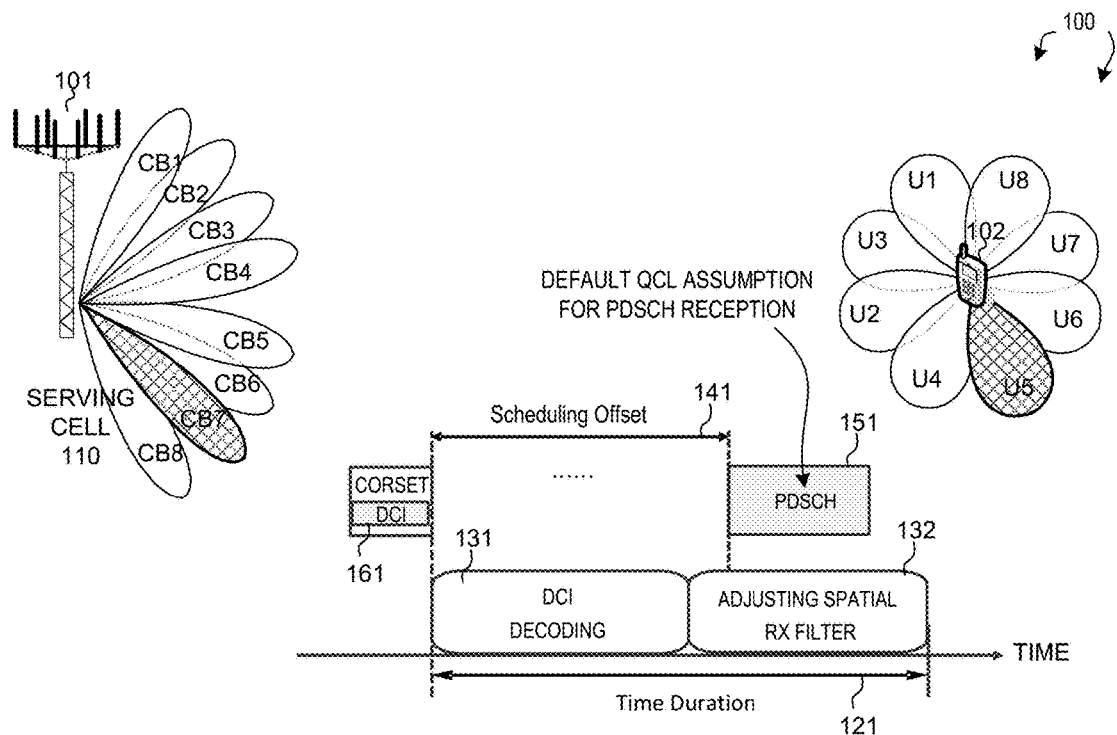
FIG. 1 illustrates a wireless communications system supporting default Quasi-Co-Location (QCL) assumption for Physical Downlink Shared Channel (PDSCH) reception in accordance with a novel aspect.

FIG. 1 illustrates a 5G new radio (NR) wireless communications system 100 supporting default Quasi-Co-Location (QCL) assumption for Physical Downlink Shared Channel (PDSCH) reception in accordance with a novel aspect. 5G NR mobile communication network 100 comprises a base station BS (or gNodeB) 101 and a user equipment UE 102. In the example of FIG. 1, BS 101 is directionally configured with multiple serving cells, and each serving cell is covered by a set of coarse TX/RX control beams. For example, serving cell 110 is covered by a set of eight downlink (DL) control beams CB1 to CB8. The collection of the DL beams CB1-CB8 covers an entire service area of cell 110. Similarly, UE 102 may also apply beamforming to form multiple UE beams, e.g., #U1-#U8. Each DL beam transmits a set of known reference signals for the purpose of initial time-frequency synchronization, identification of the control beam that transmits the reference signals, and measurement of radio channel quality for the control beam that transmits the reference signals. In NR systems, each of the DL beams are used to transmit a corresponding system synchronization block (SSB) or a corresponding channel state information reference signal (CSI-RS).

When there is a downlink packet to be sent from gNodeB to UE, each UE gets a downlink assignment, e.g., a set of radio resources in a physical downlink shared channel (PDSCH). When a UE needs to send a packet to eNodeB in the uplink, the UE gets a grant from the eNodeB that assigns a physical uplink shared channel (PUSCH) consisting of a set of uplink radio resources. The UE gets the downlink or uplink scheduling information from a physical downlink control channel (PDCCH) that is targeted specifically to that UE. In addition, broadcast control information is also sent in PDCCH to all UEs in a cell. The downlink or uplink scheduling information and the broadcast control information, carried by PDCCH, is referred to as downlink control information (DCI). The uplink control information (UCI) including HARQ ACK/NACK, CQI, MIMO feedback, scheduling requests is carried by a physical uplink control channel (PUCCH) or PUSCH if the UE has data or RRC signaling.

To save power, 5G NR introduces the concept of bandwidth part (BWP). Usage scenarios of BWP operation includes the following: 1) enabling reduced UE bandwidth capability within a wideband carrier; 2) enabling reduced UE power energy consumption by bandwidth adaptation; 3) enabling UE using different numerologies in FDM within a wideband carrier. For each UE-specific serving cell, one or more DL BWPs and one or more UL BWPs can be configured by dedicated RRC for a UE. Each UE can be configured by the network with several DL BWPs and UL BWPs, and UE is required to monitor at most one DL BWP and UL BWP at the same time. The DL BWP and UL BWP which is being monitored by the UE is called active BWP. For each UE, there is at most one active DL BWP and at most one active UL BWP at a given time for a serving cell. As a result, power consumption to monitor the downlink can be reduced because UE is only required to monitoring the smaller frequency range of the active BWP.

In a mmWave communication system where beamforming is applied at UE 102, a corresponding spatial RX filter is needed for UE to properly receive a PDSCH. In the current NR design, the spatial RX filter for the PDSCH reception can be determined according to a Quasi-Co-Location (QCL) indication conveyed by a scheduling DCI. However, there is a Time Duration 121 for determining and applying a spatial RX filter according to the QCL indication for the PDSCH reception, where the Time Duration 121 may include a latency for decoding the DCI (131) and a latency for adjusting the spatial RX filter (132). If a Scheduling Offset 141 for PDSCH 151 reception scheduled by DCI 161 is less than the Time Duration 121, then a default QCL assumption needs to be defined for the corresponding PDSCH 151 reception for UE 102. The time duration 121 is reported from UE 102 to BS 101 as a UE capability, such that UE 102 and BS 101 have a common understanding of the Time Duration 121.

UE 102 can be configured with one or multiple Control Resource SETs (CORESETs) configurations. In the current NR design, the default QCL assumption for PDSCH reception is "the demodulation reference signal (DMRS) ports of PDSCH of a serving cell are QCLed with the reference signal(s) (RS(s)) with respect to the QCL parameter(s) used for PDCCH QCL indication of the CORESET with the lowest CORESET-ID associated with a monitored search space in the latest slot in which one or more CORESETs are monitored by the UE." However, in carrier aggregation or dual-connectivity mode, multiple serving cells can be configured. In addition, a number of BWPs can be configured per serving cell. Thus, in the latest slot, there could be more than one CORESETS with the lowest CORESET ID monitored by the UE in different serving cells. In accordance with one novel aspect, to determine "the CORESET associated with a monitored search space in the latest slot with the lowest CORESET-ID", UE selects the CORESET in a per-serving cell basis. For the default QCL assumption for a PDSCH reception on a serving cell, a CORESET associated with a monitored search space in the latest slot with the lowest CORESET-ID is determined from one or more CORESETs monitored by UE 102 on an active BWP of the same serving cell.

Figure 2:
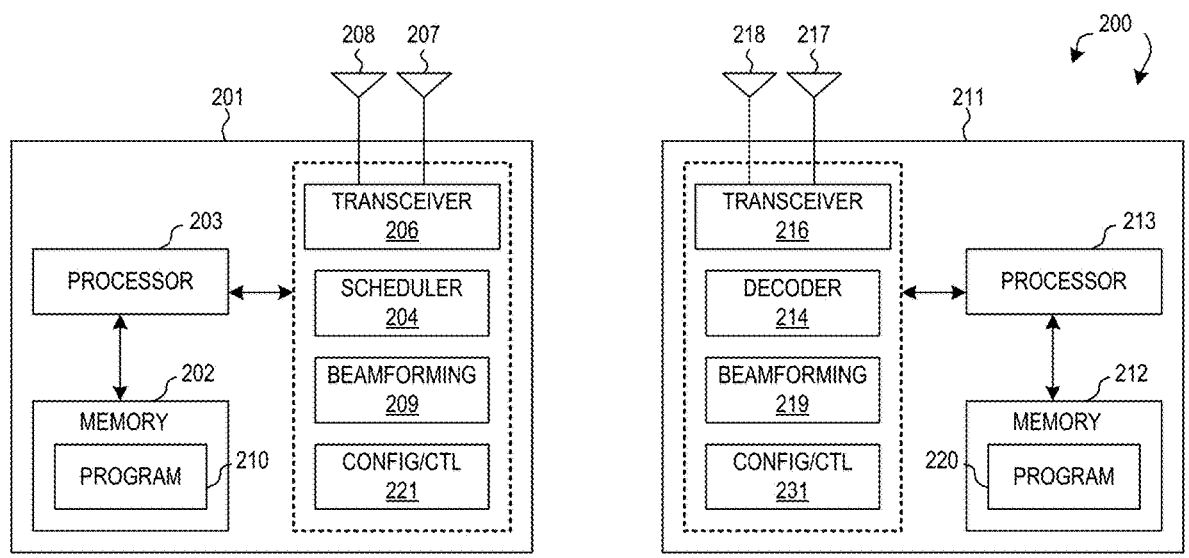
FIG. 2 is a simplified block diagram of a wireless transmitting device and a receiving device in accordance with a novel aspect.

FIG. 2 is a simplified block diagram of wireless devices 201 and 211 in accordance with a novel aspect. For wireless device 201 (e.g., a base station), antennae 207 and 208 transmit and receive radio signal. RF transceiver module 206, coupled with the antennae, receives RF signals from the antennae, converts them to baseband signals and sends them to processor 203. RF transceiver 206 also converts received baseband signals from the processor, converts them to RF signals, and sends out to antennae 207 and 208. Processor 203 processes the received baseband signals and invokes different functional modules and circuits to perform features in wireless device 201. Memory 202 stores program instructions and data 210 to control the operations of device 201.

Similarly, for wireless device 211 (e.g., a user equipment), antennae 217 and 218 transmit and receive RF signals. RF transceiver module 216, coupled with the antennae, receives RF signals from the antennae, converts them to baseband signals and sends them to processor 213. The RF transceiver 216 also converts received baseband signals from the processor, converts them to RF signals, and sends out to antennae 217 and 218. Processor 213 processes the received baseband signals and invokes different functional modules and circuits to perform features in wireless device 211. Memory 212 stores program instructions and data 220 to control the operations of the wireless device 211.

The wireless devices 201 and 211 also include several functional modules and circuits that can be implemented and configured to perform embodiments of the present invention. In the example of FIG. 2, wireless device 201 is a base station that includes a scheduler 204, a beamforming circuit 209, and a configuration and control circuit 221. Wireless device 211 is a user equipment that includes a decoder 214, a beamforming circuit 219, and a configuration and control circuit 231. The different functional modules and circuits can be implemented and configured by software, firmware, hardware, and any combination thereof. The function modules and circuits, when executed by the processors 203 and 213 (e.g., via executing program codes 210 and 220), allow BS 201 and UE 211 to perform embodiments of the present invention accordingly.

In one example, BS 201 schedules PDSCH reception for UE 211 via scheduler 204 over PDCCH. BS 201 performs beamforming for directional communication via beamforming circuit 209, and provides other control information to UE 211 via controller 221. UE 211 receives PDCCH and decodes DCI via decoder 215, and determines QCL indication conveyed by the DCI for PDSCH reception. UE 211 performs beamforming for direction communication via beamforming circuit 219 for PDSCH reception based on QCL indication or default QCL assumption, and handles other parameters (e.g., CORESET and TCI states configuration) via configuration and control circuit 231. In one embodiment, UE 211 determines default QCL assumption for PDSCH reception when the scheduling offset is less than the time duration. UE 211 assumes the DMRS ports of PDSCH on a serving cell are QCLed with the RSs with respect to the QCL parameters used for PDCCH QCL indication of the CORESET with the lowest CORESET-ID associated with a monitored search space in the latest slot in which one or more CORESETs are monitored by the UE on an active BWP of the same serving cell.

Figure 3:
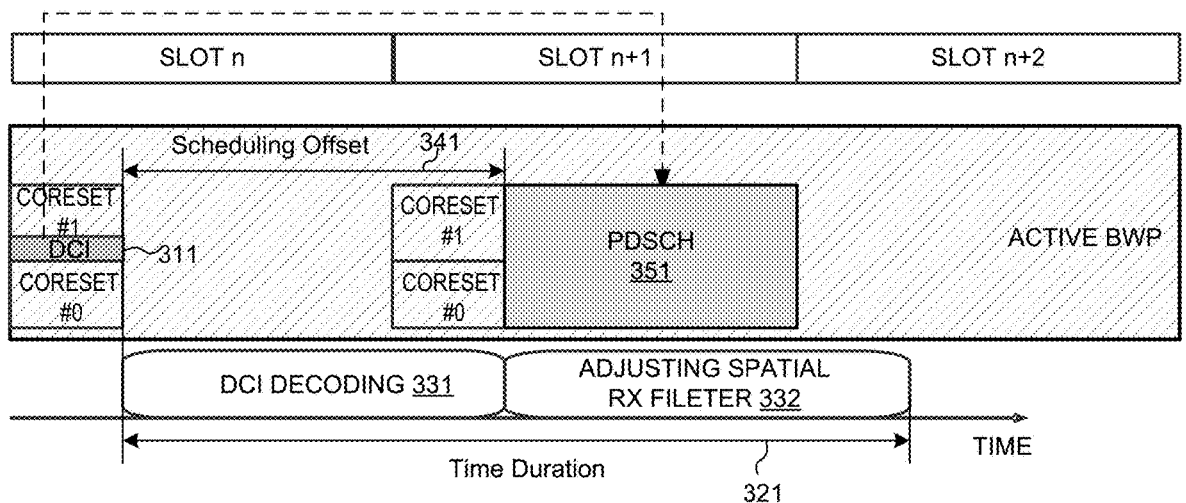
FIG. 3 illustrates the relationship between PDSCH scheduling offset and a time duration for QCL for PDSCH reception in a wireless communication system.

FIG. 3 illustrates the relationship between a scheduling offset and a time duration for PDSCH reception in a wireless communication system. A UE can be configured with one or multiple CORESET configurations. In a CORESET configuration, network provides at least the following parameters: CORESET-ID, frequency domain resources, time domain duration, scrambling ID for PDCCH DMRS, and configuration of one or more than one transmission configuration indicator (TCI) states. For a CORESET, if a UE is provided a single TCI state for a CORESET, or if the UE receives a MAC CE activation command for one of the provided TCI states for a CORESET, the UE assumes that the DMRS port associated with PDCCH receptions in the CORESET is QCLed with the one or more DL RSs configured by the TCI state. If UE has not been provided a configuration of TCI state(s), or has been provided a configuration of more than one TCI states but has not received a MAC CE activation command for one of the TCI states, then UE assumes that the DMRS port associated with PDCCH receptions is QCLed with the DL RS the UE identified during the initial access procedure or random access procedure.

The TCI state is used to provide or indicate QCL assumption. When a target reference signal (RS) or a target DMRS port(s) is QCLed with a reference RS, a UE can assume a QCL parameter(s) based on the measurement or reception of the reference RS to measure or receive the target RS or the target DMRS port(s). The QCL type (type of QCL parameter(s)) corresponding to a reference RS may take one of the followings: 'QCL-TypeA': {Doppler shift, Doppler spread, average delay, delay spread}; 'QCL-TypeB': {Doppler shift, Doppler spread}; 'QCL-TypeC': {Doppler shift, average delay}; and 'QCL-TypeD': {Spatial Rx parameter}. In mmWave communication systems where beamforming is applied, QCL-TypeD can be used to indicate the spatial Rx parameter.

In LTE OFDM systems, resource allocation is based on a regular time-frequency grid. OFDM symbols with the same numerology are allocated across the whole time-frequency grid. 5G new radio may require multiple numerologies. In a unified frame structure, the definition of a radio frame is the basic operation time unit in higher layer. The radio frame is defined as a fixed time length, e.g., 10 ms or 5 ms for all supported numerologies. Each radio frame in turn consists of a plurality of slot, the definition of a slot is the basic scheduling time unit in physical layer. The slot is defined as a fixed number of OFDM symbols, e.g., 14 OFDM symbols or 7 OFDM symbols for all supported numerologies.

In the example of FIG. 3, the UE receives multiple CORESET configurations including CORESET #0 and CORESET #1. These CORESETs are associated with one or more search spaces and monitored by the UE in different slots e.g., SLOT n, SLOT n+1, and SLOT n+2. In SLOT n, the UE monitors search space(s) that CORESET #0 and CORESET #1 are associated with. The UE decodes a DCI 311 transmitted from CORESET #1, which schedules a PDSCH 351 to be received by the UE subject to a Scheduling Offset 341. In mmWave communication systems where beamforming is applied at UE, a corresponding spatial RX filter is needed for UE to properly receive the PDSCH. In the current NR design, the spatial RX filter for a PDSCH reception can be determined according to a QCL indication conveyed by DCI 311. There is a Time Duration 321 for determining and applying a spatial RX filter according to the QCL indication for the PDSCH reception, where the Time Duration 321 may include a latency for decoding the DCI (331) and a latency for adjusting the spatial RX filter (332). If the Scheduling Offset 341 for PDSCH 351 reception scheduled by DCI 161 is less than the Time Duration 321, then a default QCL assumption needs to be defined for the corresponding PDSCH 351 reception for the UE.

In the current NR design, the default QCL assumption for PDSCH reception is "the DMRS ports of PDSCH of a serving cell are QCLed with the RS(s) with respect to the QCL parameter(s) used for PDCCH QCL indication of the CORESET with the lowest CORESET-ID associated with a monitored search space in the latest slot in which one or more CORESETs are monitored by the UE." In the example of FIG. 3, the latest slot is SLOT n+1, in which multiple CORESTS are monitored by the UE, and the CORESET with the lowest CORESET-ID is CORESET #0 monitored by the UE in SLOT n+1. As a result, the UE uses the same QCL parameters for PDCCH QCL indication of CORESET #0 monitored in SLOT n+1 as the DMRS ports for PDSCH reception. In other words, the UE can use the same spatial RX filter to receive PDSCH 351 as the spatial RX filter used for the PDCCH/DCI reception of CORESET #0 in SLOT n+1.

Figure 4:
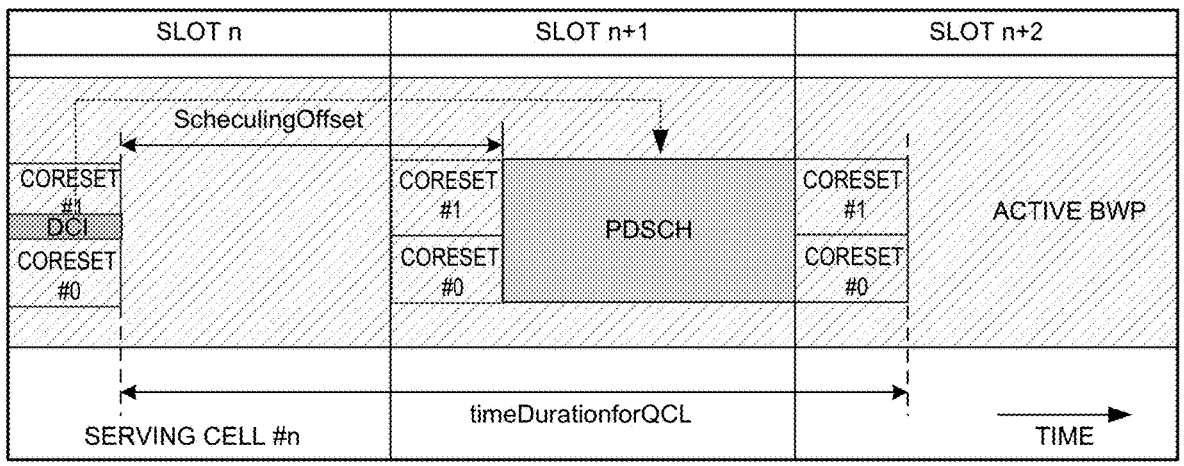
FIG. 4 illustrates the relationship between PDSCH scheduling offset and a time duration for QCL for PDSCH reception and default QCL assumption with multiple serving cells in a wireless communication system.
Figure 4:
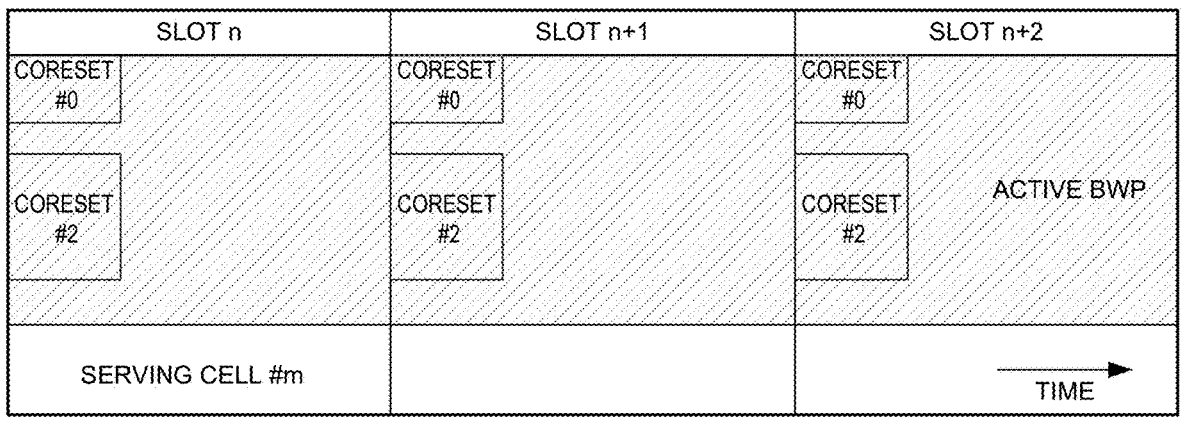

FIG. 4 illustrates the relationship between a scheduling offset and a time duration for PDSCH reception and default QCL assumption with multiple serving cells in a wireless communication system. In carrier aggregation or dual-connectivity mode, multiple serving cells can be configured. In addition, a number of BWPs can be configured per serving cells. Thus, there could be more than one CORESETS with the lowest CORESET ID in different serving cells in the latest slot monitored by the UE. In the example of FIG. 4, there are two serving cells: serving cell #n and serving cell #m. The default QCL assumption for PDSCH reception on serving cell #n should follow CORESET #0 on serving cell #n or CORESET #0 on serving cell #m? In addition, if multiple BWPs are configured for the serving cell, which BWP should be used for CORESET determination? In accordance with one novel aspect, to determine "the CORESET associated with a monitored search space in the latest slot with the lowest CORESET-ID", UE can select the CORESET in a per serving cell basis. For the default QCL assumption for a PDSCH reception on a serving cell, a CORESET associated with a monitored search space in the latest slot with the lowest CORESET-ID is determined from one or more CORESETs on an active BWP of the serving cell in which the PDSCH reception is scheduled. In the example of FIG. 4, the default QCL assumption for PDSCH reception on serving cell #n should follow CORESET #0 on the active BWP on serving cell #n.

Figure 5:
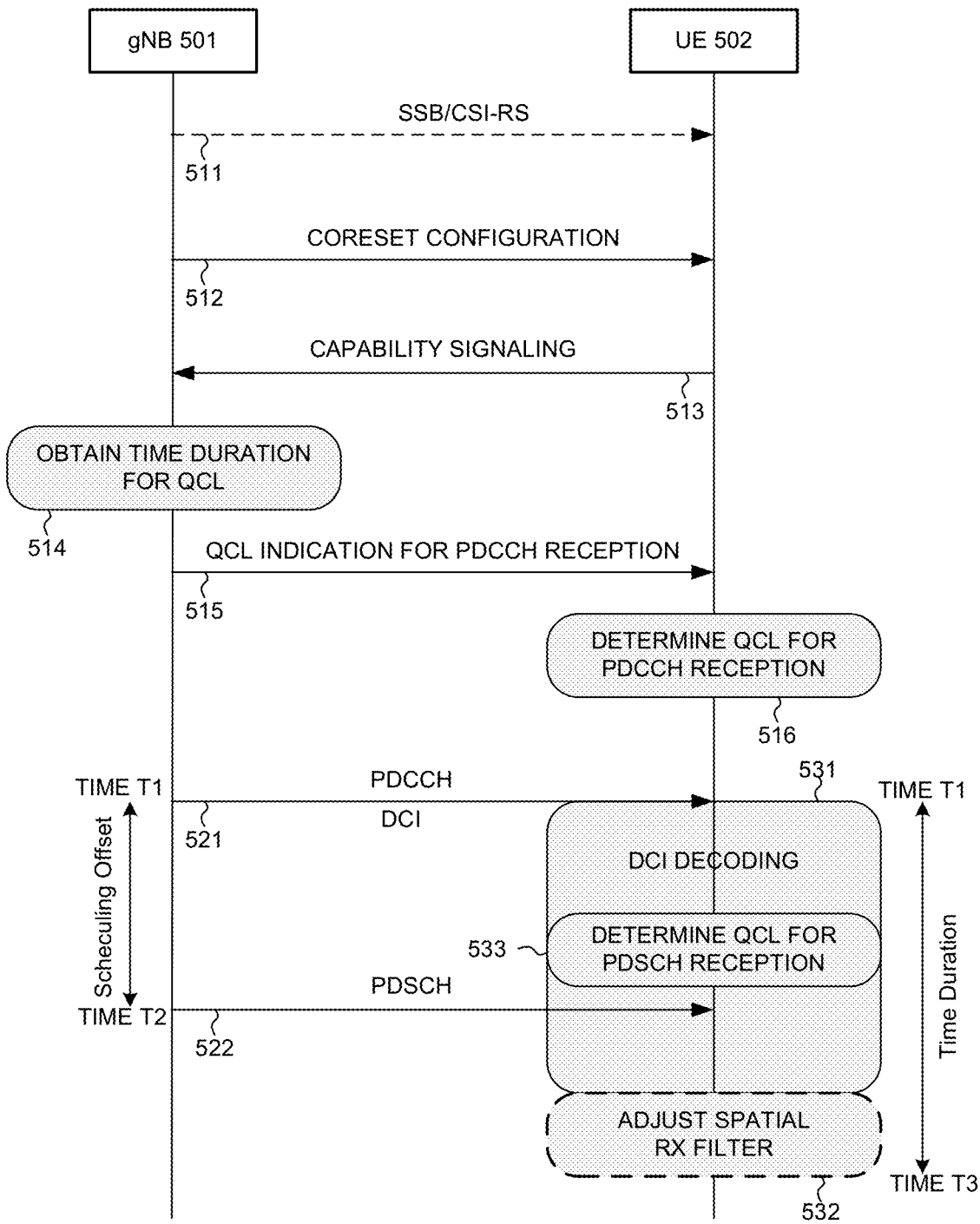
FIG. 5 illustrates a sequence flow between a base station and a user equipment for PDSCH scheduling and reception with default QCL assumption in a wireless communication system.

FIG. 5 illustrates a sequence flow between a base station and a user equipment for PDSCH scheduling and reception with default QCL assumption in a wireless communication system. In step 511, UE 502 may receive synchronization signal block (SSB) or channel state information RS (CSI-RS) from gNB 501 during the initial access procedure. In step 512, UE 502 is configured with one or multiple CORESETs, wherein each CORESET is provided with one or multiple TCI states. If a CORESET is provided with more than one TCI states, one of the TCI states may be indicated by a MAC CE activation command. In step 513, UE 502 can report its UE capability to gNB 501, the UE capability can include a Time Duration required for PDSCH reception. The Time Duration may include a latency for DCI decoding and a latency for adjusting a spatial Rx filter. In step 514, gNB obtains the Time Duration from the UE capability. Note that gNB 501 still can schedule a PDSCH reception with scheduling offset less than the time duration reported by the UE 502 to achieve more scheduling flexibility or low latency purpose. In step 515, UE 502 may receive one or more multiple MAC CE activation commands for indicating one or more TCI states for one or more configured CORESET. In step 516, UE 502 determines QCL assumptions for the DMRS ports associated with PDCCH receptions in the configured CORESETs.

In step 521, gNB 501 transmits DCI at time T1 to UE 502 over PDCCH for PDSCH scheduling at time T2 with a Scheduling Offset. In step 531, UE 502 receives the DCI and performs DCI decoding, which conveys QCL indication for the PDSCH reception for the UE. Based on the decoded QCL indication, UE 502 can then adjust its spatial Rx filter for the PDSCH reception (in step 532) at time T3 after the Time Duration. However, the scheduled PDSCH reception occurs at time T2, which is before time T3. Therefore, instead of relying on the decoded QCL indication conveyed by the DCI, UE 502 uses a default QCL assumption to perform the scheduled PDSCH reception at time T2. Note that when UE 502 monitors the CORESET with lowest ID in the latest slot, a spatial Rx filter has been formed to receive and buffer the symbols within the monitored search space that the CORESET is associated with. Within the duration from T1 (or the beginning of the CORESET) to T3, UE use the same filter to buffer all of the symbols. After UE decodes the DCI transmitted in step 521, UE realizes that there is a PDSCH transmitted within the duration. Since both gNB 501 and UE 502 know the default QCL assumption, the PDSCH still can be correct received even UE "blindly" forms a Rx beam to receive the PDSCH.

Figure 6:
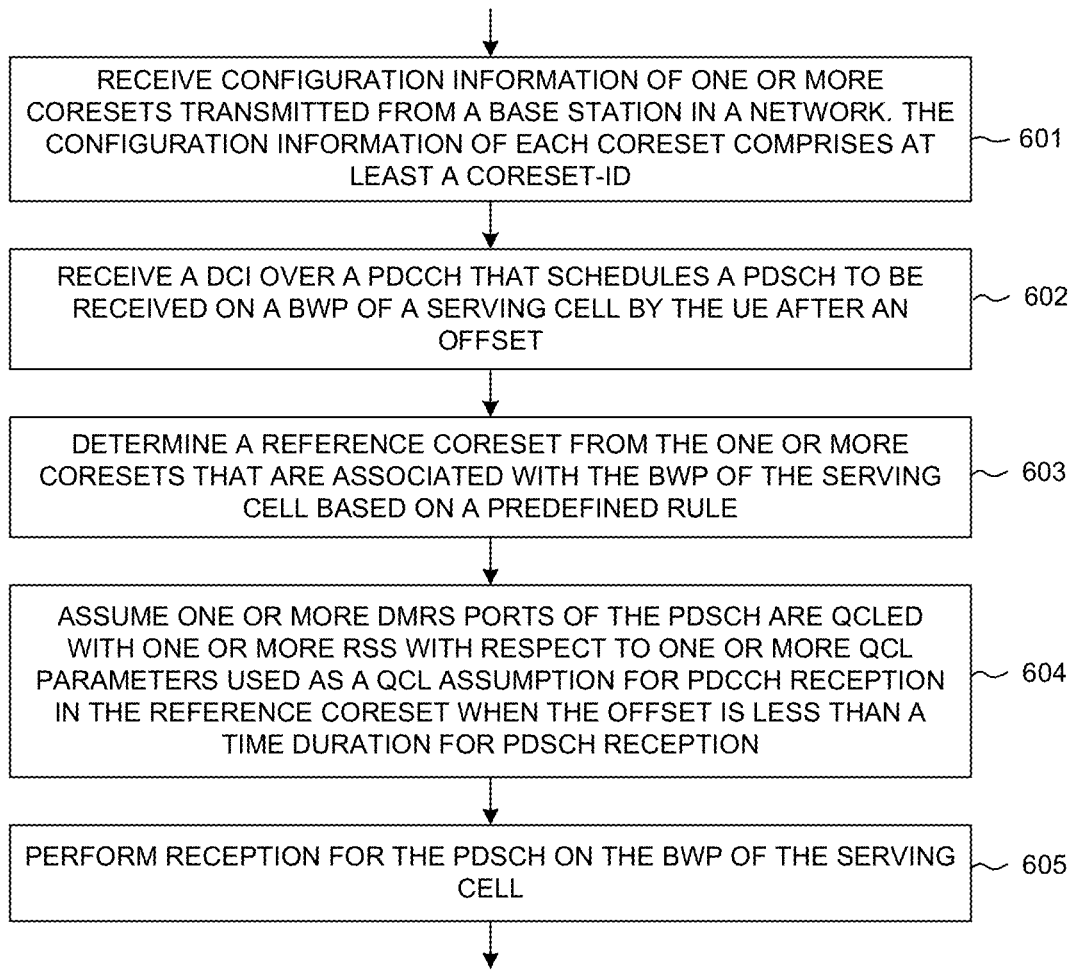
FIG. 6 is a flow chart of a method of default QCL assumption for PDSCH reception with multiple serving cells in a wireless communication system in accordance with one novel aspect.

FIG. 6 is a flow chart of a method of default QCL assumption for PDSCH reception with multiple serving cells in a wireless communication system in accordance with one novel aspect. In step 601, a UE receives configuration information of one or more CORESETs transmitted from a base station in a wireless communications network. The configuration information of each CORESET comprises at least a CORESET-ID. In step 602, the UE receives a downlink control information (DCI) over a physical downlink control channel (PDCCH) that schedules a physical downlink shared channel (PDSCH) to be received on a bandwidth part (BWP) of a serving cell by the UE after an offset. In step 603, the UE determines a reference CORESET from the one or more CORESETs that are associated with the BWP of the serving cell based on a predefined rule. In step 604, the UE assumes one or more demodulation reference signal (DMRS) ports of the PDSCH are QCLed with one or more references signals with respect to one or more QCL parameters used as a QCL assumption for PDCCH reception in the reference CORESET when the offset is less than a time duration for PDSCH reception. In step 605, the UE performs reception for the PDSCH on the BWP of the serving cell.

Although the present invention has been described in connection with certain specific embodiments for instructional purposes, the present invention is not limited thereto. Accordingly, various modifications, adaptations, and combinations of various features of the described embodiments can be practiced without departing from the scope of the invention as set forth in the claims.

What is claimed is:

1. A method comprising:
receiving configuration information of one or more control resource SETs (CORESETs) transmitted from a base station by a user equipment (UE) in a wireless communications network, wherein the configuration information of each CORESET comprises at least a CORESET-ID;

receiving a downlink control information (DCI) over a physical downlink control channel (PDCCH) that schedules a physical downlink shared channel (PDSCH) to be received on a bandwidth part (BWP) of a serving cell by the UE after an offset;

determining a reference CORESET from the one or more CORESETs that are associated with the BWP of the serving cell based on a predefined rule;

assuming one or more demodulation reference signal (DMRS) ports of the PDSCH are Quasi-Co-Located (QCLed) with one or more references signals with respect to one or more QCL parameters used as a QCL assumption for PDCCH reception in the reference CORESET when the offset is less than a time duration for PDSCH reception; and performing reception for the PDSCH on the BWP of the serving cell.

2. The method of claim 1, wherein the determining the reference CORESET from the one or more CORESETs that are associated with the BWP of the serving cell based on a predefined rule involves:

determining the reference CORESET as a CORESET with a lowest CORESET-ID from the one or more CORESETs that are associated with the active BWP of the serving cell and associated with one or more search spaces in the latest slot monitored by the UE.

3. The method of claim 2, wherein the one or more search spaces are associated with the BWP of the serving cell.

4. The method of claim 1, wherein the UE is configured with one or more serving cells.

5. The method of claim 1, wherein the UE is configured with one or more bandwidth parts (BWPs) within a carrier bandwidth of the serving cell.

6. The method of claim 1, wherein the QCL assumption for PDCCH reception in the reference CORESET is provided by an activation command that activates one of transmission configuration indication (TCI) states configured by the configuration information of the reference CORESET.

7. The method of claim 1, wherein the QCL assumption for PDCCH reception in the reference CORESET is provided by a transmission configuration indication (TCI) state configured by the configuration information of the reference CORESET.

8. The method of claim 1, wherein the QCL assumption for PDCCH reception in the reference CORESET is provided as a synchronization signal block (SSB) the UE identified during initial access if no transmission configuration indication (TCI) states is configured by the configuration information of the reference CORESET.

9. The method of claim 1, wherein the QCL assumption for PDCCH reception in the reference CORESET is provided as a synchronization signal block (SSB) the UE identified during initial access if more than one transmission configuration indication (TCI) states are configured by the configuration information of the reference CORESET but no activation command for activating one of the TCI states.

10. The method of claim 1, wherein the UE reports the time duration for PDSCH reception to the base station as a UE capability.

11. The method of claim 1, wherein the time duration for PDSCH reception includes a downlink control information (DCI) decoding latency and a spatial RX filter adjustment latency.

12. A User Equipment (UE) comprising:

a receiver that receives configuration information of one or more control resource SETs (CORESETs) transmitted from a base station in a wireless communications network, wherein the configuration information of each CORESET comprises at least a CORESET-ID;

a decoder that decodes a downlink control information (DCI) over a physical downlink control channel (PDCCH) that schedules a physical downlink shared channel (PDSCH) to be received on a bandwidth part (BWP) of a serving cell by the UE after an offset;

a control circuit that determines a reference CORESET from the one or more CORESETs that are associated with the BWP of the serving cell based on a predefined rule; and a beamforming circuit that assumes one or more demodulation reference signal (DMRS) ports of the PDSCH are Quasi-Co-Located (QCLed) with one or more references signals with respect to one or more QCL parameters used as a QCL assumption for PDCCH reception in the reference CORESET when the offset is less than a time duration for PDSCH reception, wherein the UE performs reception for the PDSCH on the BWP of the serving cell.

13. The UE of claim 12, wherein the determining the reference CORESET from the one or more CORESETs that are associated with the BWP of the serving cell based on a predefined rule involves determining the reference CORESET as a CORESET with a lowest CORESET-ID from the one or more CORESETs that are associated with the active BWP of the serving cell and associated with one or more search spaces in the latest slot monitored by the UE.

14. The UE of claim 13, wherein the one or more search spaces are associated with the BWP of the serving cell.

15. The UE of claim 12, wherein the UE is configured with one or more serving cells.

16. The UE of claim 12, wherein the UE is configured with one or more bandwidth parts (BWPs) within a carrier bandwidth of the serving cell.

17. The UE of claim 12, wherein the QCL assumption for PDCCH reception in the reference CORESET is provided by an activation command that activates one of transmission configuration indication (TCI) states configured by the configuration information of the reference CORESET.

18. The UE of claim 12, wherein the QCL assumption for PDCCH reception in the reference CORESET is provided by a transmission configuration indication (TCI) state configured by the configuration information of the reference CORESET.

19. The UE of claim 12, wherein the QCL assumption for PDCCH reception in the reference CORESET is provided as a synchronization signal block (SSB) the UE identified during initial access if no transmission configuration indication (TCI) states is configured by the configuration information of the reference CORESET.

20. The UE of claim 12, wherein the QCL assumption for PDCCH reception in the reference CORESET is provided as a synchronization signal block (SSB) the UE identified during initial access if more than one transmission configuration indication (TCI) states are configured by the configuration information of the reference CORESET but no activation command for activating one of the TCI states.

21. The UE of claim 12, wherein the UE reports the time duration for PDSCH reception to the base station as a UE capability.

22. The UE of claim 12, wherein the time duration for PDSCH reception includes a downlink control information (DCI) decoding latency and a spatial RX filter adjustment latency.

\* \* \* \* \*